United States Patent
Seo et al.

(10) Patent No.: US 7,850,569 B2
(45) Date of Patent: Dec. 14, 2010

(54) GEAR TRAIN OF AN AUTOMATIC TRANSMISSION FOR A VEHICLE

(75) Inventors: Kangsoo Seo, Suwon (KR); Young Ji Park, Hwaseong (KR)

(73) Assignee: Hyundai Motor Company, Seoul (KR)

( * ) Notice: Subject to any disclaimer, the term of this patent is extended or adjusted under 35 U.S.C. 154(b) by 577 days.

(21) Appl. No.: 11/949,594

(22) Filed: Dec. 3, 2007

(65) Prior Publication Data

US 2009/0048062 A1    Feb. 19, 2009

(30) Foreign Application Priority Data

Aug. 16, 2007    (KR) .................... 10-2007-0082377

(51) Int. Cl.
  *F16H 3/62* (2006.01)
(52) U.S. Cl. ...................................... 475/281
(58) Field of Classification Search ............. 475/276, 475/280, 281, 290, 291
  See application file for complete search history.

(56) References Cited

U.S. PATENT DOCUMENTS

| 7,192,378 B2* | 3/2007 | Raghavan et al. | 475/276 |
| 2002/0115522 A1* | 8/2002 | Raghavan et al. | 475/276 |
| 2008/0119318 A1* | 5/2008 | Phillips et al. | 475/276 |

* cited by examiner

*Primary Examiner*—Roger L Pang
*Assistant Examiner*—Edwin A. Young
(74) *Attorney, Agent, or Firm*—Morgan, Lewis & Bockius LLP

(57) ABSTRACT

A gear train of an automatic transmission for a vehicle includes: a first planetary gear set that receives an input speed from an input shaft and outputs a reduced speed; a second planetary gear set that receives the reduced speed of the first planetary gear set and selectively outputs a same speed or a reversed speed; and a third planetary gear set that receives the reduced speed of the first planetary gear set, the input speed from the input shaft, and the output speed of the second planetary gear set, and then outputs a shifted output speed.

18 Claims, 5 Drawing Sheets

FIG.2

|   | C1 | C2 | C3 | C4 | B1 | B2 | F |
|---|----|----|----|----|----|----|----|
| 1st | ● |   |   |   | ○ |   | ● |
| 2nd | ● |   |   |   |   | ● |   |
| 3rd | ● |   |   | ● |   |   |   |
| 4th | ● |   | ● |   |   |   |   |
| 5th |   |   | ● | ● |   |   |   |
| 6th |   | ● | ● |   |   |   |   |
| 7th |   |   | ● |   |   | ● |   |
| 8th |   |   | ● |   | ● |   |   |
| Rev. |   |   |   | ● | ● |   |   |

GEAR TRAIN OF AN AUTOMATIC TRANSMISSION FOR A VEHICLE

CROSS-REFERENCE TO RELATED APPLICATION

This application claims priority to and the benefit of Korean Patent Application No. 10-2007-0082377, filed in the Korean Intellectual Property Office on Aug. 16, 2007, the entire contents of which are incorporated herein by reference.

BACKGROUND OF THE INVENTION (a) Field of the Invention

The present invention relates to a gear train of an automatic transmission for a vehicle that enables eight forward speeds and one reverse speed by combining two simple planetary gear sets and one compound planetary gear set using four clutches and two brakes.

(b) Description of the Related Art

The present invention relates to a gear train of an automatic transmission for a vehicle.

A typical shift mechanism of an automatic transmission utilizes a combination of a plurality of planetary gear sets. A gear train of such an automatic transmission that includes the plurality of planetary gear sets changes rotating speed and torque received from a torque converter of the automatic transmission, and accordingly changes and transmits the changed torque to an output shaft.

It is well known that when a transmission realizes a greater number of shift speeds, speed ratios of the transmission can be more optimally designed and therefore a vehicle can have better fuel mileage and better performance. For that reason, an automatic transmission that enables more shift speeds is under constant investigation.

In addition, with the same number of speeds, features of a gear train such as durability, efficiency in power transmission, and size depend a lot on the layout of combined planetary gear sets. Therefore, designs for a combining structure of a gear train are also under constant investigation.

A manual transmission that has too many shift-speeds causes inconvenience of excessively frequent shifting operations to a driver. Therefore, the positive features of more shift-speeds are more important for automatic transmissions because an automatic transmission automatically controls shifting operations basically without needing manual operation.

In addition to various developments regarding four and five speed gear trains, gear trains of automatic transmissions realizing six forward speeds and one reverse speed have been introduced, and also, gear trains realizing more number of speeds are under investigation.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a gear train of an automatic transmission for a vehicle having advantages of an enhanced power delivery performance and an improved fuel consumption by enabling eight forward speeds and one reverse speed by combining two simple planetary gear sets and one compound planetary gear set using four clutches and two brakes.

An exemplary embodiment of the present invention provides a gear train of an automatic transmission for a vehicle that includes: a first planetary gear set of a simple planetary gear set that receives an input speed from an input shaft through a main input path and outputs a reduced speed through a first intermediate output path; a second planetary gear set of a simple planetary gear set that receives the reduced speed of the intermediate output path of the first planetary gear set through a first intermediate input path and selectively outputs a same speed and a reversed speed through a second intermediate output path; and a third planetary gear set of a compound planetary gear set that receives the reduced speed of the first planetary gear set through a first intermediate variable input path, the input speed from the input shaft through a second intermediate variable input path, and the output speed of the second planetary gear set through a second intermediate input path, and then outputs a shifted output speed through a main output path.

In the exemplary gear train, the first planetary gear set may be a single pinion planetary gear set, the second planetary gear set may be a double pinion planetary gear set, and the third planetary gear set may be a compound planetary gear set that is formed as a combination of single and double pinion planetary gear sets having a common ring gear and a common planet carrier.

The first planetary gear set may include a first sun gear, a first planet carrier, and a first ring gear, wherein the first sun gear acts as an input element and forms the main input path; the first planet carrier acts as an output element and forms the first intermediate output path; and the first ring gear is directly connected with a transmission housing and acts as a fixed element.

The second planetary gear set may include a second sun gear, a second planet carrier, and a second ring gear, wherein the second sun gear is directly connected with the first intermediate output path of the first planetary gear set and forms the first intermediate input path; the second planet carrier acts as an output element and forms the second intermediate output path; the second ring gear is variably connected with a transmission housing and selectively acts as a fixed element; and a clutch is arranged to variably interconnect two elements among the second sun gear, the second planet carrier, and the second ring gear such that the second planetary gear may integrally rotate under an operation of the clutch.

The clutch may be arranged to variably interconnect the second planet carrier and the second ring gear. In this case, the clutch may be arranged rearward of the second planetary gear set.

The clutch may be arranged to variably interconnect the second sun gear and the second ring gear. In this case, the clutch may be arranged forward to the second planetary gear set.

The clutch may be arranged to variably interconnect the second sun gear and the second planet carrier. In this case, the clutch may be arranged forward to the second planetary gear set.

The third planetary gear set may include a smaller diameter sun gear, a larger diameter sun gear, a third planet carrier, and a third ring gear, wherein the smaller diameter sun gear is variably connected with the first intermediate output path of the first planetary gear set and forms the first intermediate variable input path; the larger diameter sun gear is directly connected with the second intermediate output path of the second planetary gear set so as to form the second intermediate input path and is variably connected with a transmission housing so as to selectively act as a fixed element; the third planet carrier is variably connected with the input shaft so as to form the second intermediate variable input path; and the third ring gear is variably connected with the larger diameter sun gear and acts as an output element so as to form the main output path.

In addition, another exemplary embodiment of the present invention provides a gear train of an automatic transmission for a vehicle that includes first, second, and third planetary gear sets, wherein the first planetary gear set is a single pinion planetary gear set and comprises a first sun gear directly connected with an input shaft so as to act as an input element, a first planet carrier acting as an output element so as to form a first intermediate output path, and a first ring gear directly connected with a transmission housing so as to act as a fixed element; the second planetary gear set is a double pinion planetary gear set and comprises a second sun gear directly connected with the first intermediate output path of the first planetary gear set so as to form a first intermediate input path, a second planet carrier acting as an output element so as to form a second intermediate output path, and a second ring gear variably connected with a transmission housing through a one-way clutch and a first brake so as to selectively act as a fixed element, where a second clutch is arranged between two operational elements selected from the second sun gear, the second planet carrier, and the second ring gear; and the third planetary gear set is a compound planetary gear set and comprises a smaller diameter sun gear forming a first intermediate variable input path by being variably connected with the first intermediate output path of the first planetary gear set through a first clutch, a larger diameter sun gear forming a second intermediate input path by being directly connect with the second intermediate output path of the second planetary gear set, a common planet carrier forming a second intermediate variable input path by being variably connected with the input shaft through a third clutch, and a common ring gear variably connected with the larger diameter sun gear through a fourth clutch and forming a main output path.

The second clutch may be arranged to variably interconnect the second planet carrier and the second ring gear. In this case, the second clutch may be arranged rearward of the second planetary gear set.

The second clutch may be arranged to variably interconnect the second sun gear and the second ring gear. In this case, the second clutch may be arranged forward to the second planetary gear set.

The second clutch may be arranged to variably interconnect the second sun gear and the second planet carrier. In this case, the second clutch may be arranged forward to the second planetary gear set.

According to above exemplary gear train, eight forward speeds and one reverse speed are enabled by combining two simple planetary gear sets and one compound planetary gear set using four clutches and two brakes, and an improved power delivery performance and enhanced fuel consumption may be achieved.

The above features and advantages of the present invention will be apparent from or are set forth in more detail in the accompanying drawings, which are incorporated in and form a part of this specification, and the following Detailed Description of the Invention, which together serve to explain by way of example the principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein:

FIG. 2 is an operational chart of friction members of a gear train of an automatic transmission according to a first exemplary embodiment of the present invention.

Figure 1:
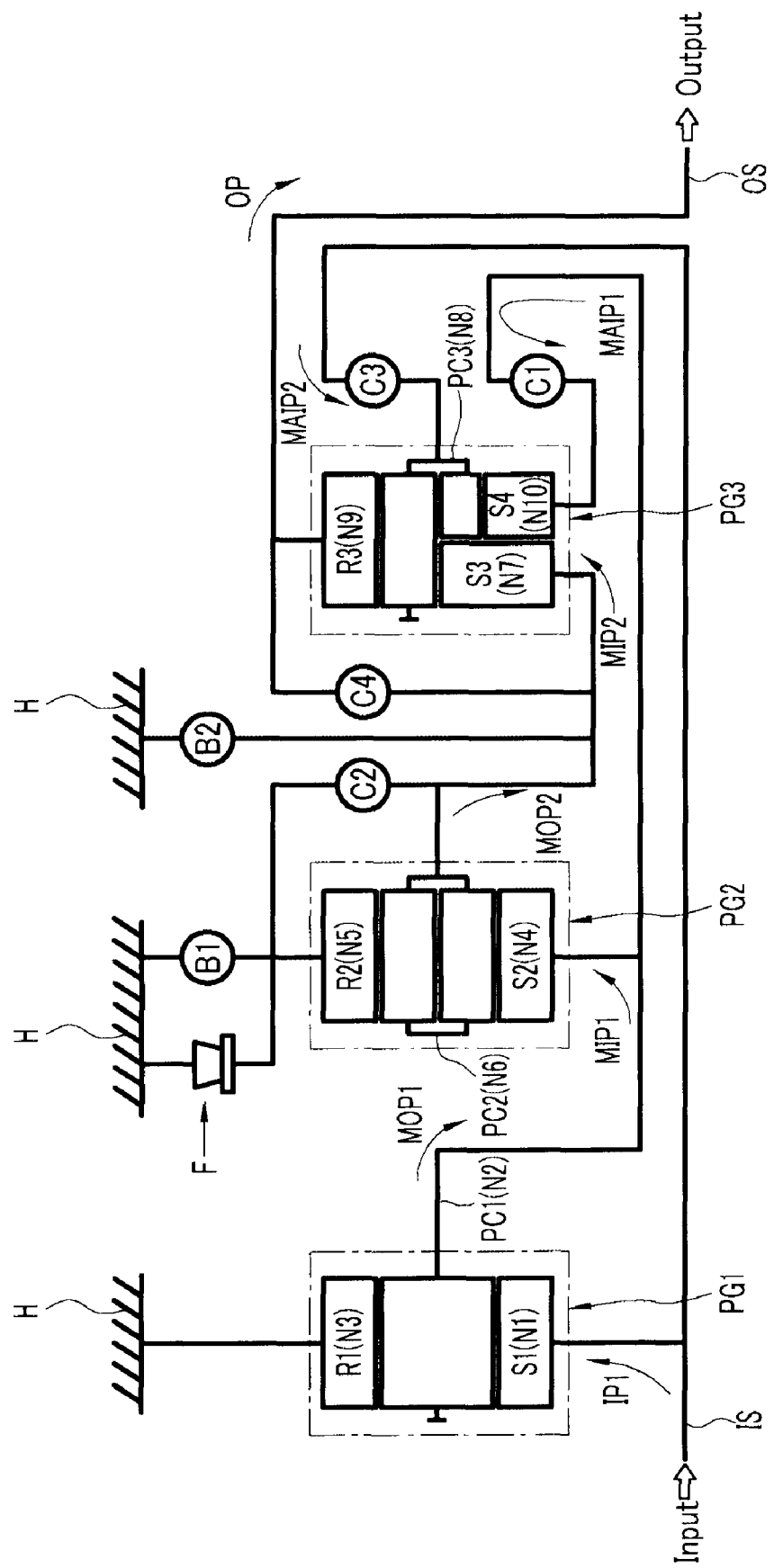
FIG. 1 is a schematic diagram of a gear train of an automatic transmission according to a first exemplary embodiment of the present invention.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE EMBODIMENTS

Hereinafter reference will now be made in detail to various embodiments of the present invention, examples of which are illustrated in the accompanying drawings and described below. While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

Hereinafter, exemplary embodiments of the present invention are described in detail with reference to accompanying drawings.

FIG. 1 is a schematic diagram of a gear train of an automatic transmission according to a first exemplary embodiment of the present invention. The gear train of an automatic transmission according to a first exemplary embodiment includes first, second, and third planetary gear sets PG1, PG2, and PG3. The first and second planetary gear sets PG1 and PG2 are respectively simple planetary gear sets. The third planetary gear set PG3 is a compound planetary gear set.

An input speed inputted through an input shaft IS is changed through the first, second, and third planetary gear sets PG1, PG2, and PG3, and then is output through an output shaft OS.

Here, the input shaft IS is an overall input member of the transmission and may denote a turbine shaft of a torque converter (not shown). A rotation speed of a crankshaft of an engine is delivered to the input shaft IS through the torque converter. The output shaft OS is an overall output member of the transmission, and may deliver a driving torque to left and right drive-wheels through an output gear (not shown) and a differential apparatus (not shown).

In more detail, the first planetary gear set PG1 receives the input speed through a first input path IP1 directly, and outputs a reduced speed to a first intermediate output path MOP1.

The first planetary gear set PG1 is formed as a single pinion planetary gear set that includes a first sun gear S1, a first planet carrier PC1, and a first ring gear R1. Hereinafter, the first sun gear S1 called a first operational element N1, the first planet carrier PC1 is called a second operational element N2, and the first ring gear R1 is called a third operational element N3. The first operational element N1 is directly connected with the input shaft IS and forms the first input path IP1. The second operational element N2 acts as an output element of the first planetary gear set PG1 and forms the first intermediate output path MOP1. The third operational element N3 is directly connected with a transmission housing H, and acts as a fixed element.

Therefore, the input speed inputted through the first operational element N1 is reduced at the first planetary gear set PG1 and the reduced speed is output through the second operational element N2.

The second planetary gear set PG2 receives the reduced speed of the first planetary gear set PG1 through a first intermediate input path MIP1 and selectively outputs a same speed or a reversed speed through a second intermediate output path MOP2.

The second planetary gear set PG2 is formed as a double pinion planetary gear set that includes a second sun gear S2, a second planet carrier PC2, and a second ring gear R2. Hereinafter, the second sun gear S2 is called a fourth operational element N4, the second ring gear R2 is called a the fifth operational element N5, and the second planet carrier PC2 is called a sixth operational element N6. The fourth operational element N4 is directly connected with the first intermediate output path MOP1 and forms the first intermediate input path MIP1. The sixth operational element N6 acts as an output element and forms the second intermediate output path MOP2.

The fifth operational element N5 selectively acts as a fixed element by being variably connected with a transmission housing H through a first brake B1 and a one-way clutch F that is arranged in parallel. The fifth operational element N5 and the sixth operational element N6 are variably connected with each other by a second clutch C2.

According to the above configuration, when the first brake B1 or the one-way clutch F operates while the second planetary gear set receives a reduced rotation speed through the first intermediate input path MIP1, a reversed speed is output through the second intermediate output path MOP2. When the second clutch C2 is operating, the second planetary gear set PG2 integrally rotates such that the same speed as the received rotation speed is output through the second intermediate output path MOP2.

The third planetary gear set PG3 receives a rotation speed through a first intermediate variable input path MAIP1, a second intermediate variable input path MAIP2, and a second intermediate input path MIP2.

The reduced speed of the first intermediate output path MOP1 of the first planetary gear set PG1 is variably input through the first intermediate variable input path MAIP1. The input speed of the input shaft IS is variably input through the second intermediate variable input path MAIP2. The output speed of the second intermediate output path MOP2 of the second planetary gear set PG2 is always input through the second intermediate input path MIP2.

By manipulating the rotation speeds inputted through the first intermediate variable input path MAIP1, the second intermediate variable input path MAIP2, and the second intermediate input path MIP2, the third planetary gear set PG3 forms eight forward speeds and one reverse speed and then outputs a final speed to the output path OP.

The third planetary gear set PG3 is formed as a combination of a single pinion planetary gear set and a double pinion planetary gear set, and includes a larger diameter sun gear (also called a third sun gear) S3, a smaller diameter sun gear (also called a fourth sun gear) S4, a third planet carrier PC3, and a third ring gear R3. That is, the third planetary gear set PG3 has four operational elements including the larger diameter sun gear S3 and the smaller diameter sun gear S4 since the single and double planetary gear sets included therein commonly has the third planet carrier PC3 and the third ring gear R3.

Hereinafter, the larger diameter sun gear S3 is called a seventh operational element N7, the third planet carrier PC3 is called an eighth operational element N8, the third ring gear R3 is called a ninth operational element N9, and the smaller diameter sun gear S4 is called a tenth operational element N10. The seventh operational element N7 is directly connected with the second intermediate output path MOP2 and forms the second intermediate input path MIP2. The tenth operational element N10 is variably connected with the first intermediate output path MOP1 and forms the first intermediate variable input path MAIP1. The eighth operational element N8 is variably connected with the input shaft IS and forms the second intermediate variable input path MAIP2. The ninth operational element N9 is connected with the output shaft OS and forms the final output path OP.

The eighth operational element N8 acts as an input element by being variably connected with the input shaft IS through a third clutch C3. The tenth operational element N10 acts as an input element by being variably connected with the second operational element N2 through a first clutch C1. The seventh operational element N7 and the ninth operational element N9 are variably connected with each other by a fourth clutch C4.

In addition, the seventh operational element N7 selectively acts as a fixed element by being variably connected with the transmission housing H by a second brake B2.

The first, second, third, and fourth clutches C1, C2, C3, and C4 and the first and second brakes B1 and B2 may be realized as a multi-plate hydraulic pressure unit where the clutches and brakes are engaged by hydraulic pressure.

FIG. 2 is an operational chart of friction members of a gear train of an automatic transmission according to a first exemplary embodiment of the present invention. As can be understood in FIG. 2, each forward or reverse speed is enabled by engaging specific friction members appropriate for that speed.

Figure 3:
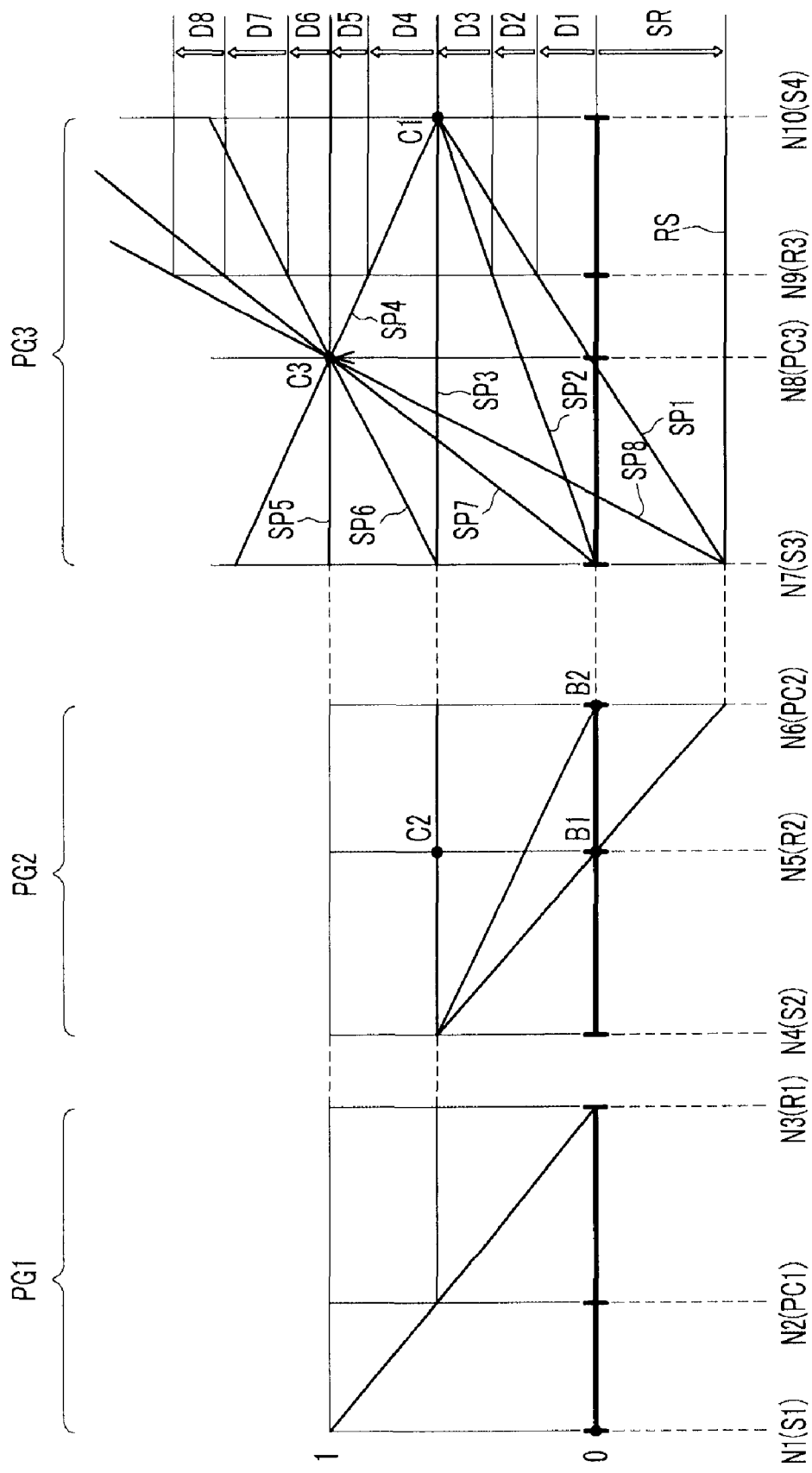
FIG. 3 is a speed diagram of a gear train of an automatic transmission according to a first exemplary embodiment of the present invention.

FIG. 3 is a speed diagram of a gear train of an automatic transmission according to a first exemplary embodiment of the present invention. A lower horizontal line marked with "0" denotes a zero (0) rotation speed, and an upper horizontal line marked with "1" denotes the input speed, i.e., the same speed with the input shaft IS.

Three vertical lines of the first planetary gear set PG1 corresponds to, sequentially from the left to the right, the first operational element N1 of the first sun gear S1, the second operational element N2 of the first planet carrier PC1, and the third operational element N3 of the third ring gear R1. The horizontal spacing between the three vertical lines depends on a sun gear/ring gear teeth ratio of the first planetary gear set PG1.

In addition, three vertical lines of the second planetary gear set PG2 corresponds to, sequentially from the left to the right, the fourth operational element N4 of the second sun gear S2, the fifth operational element N5 of the second ring gear R2, and the sixth operational element N6 of the second planet carrier PC2. The horizontal spacing between the three vertical lines depends on a sun gear/ring gear teeth ratio of the second planetary gear set PG2.

Also, four vertical lines of the third planetary gear set PG3 corresponds to, sequentially from the left to the right, the seventh operational element N7 of the larger diameter sun gear S3, the eighth operational element N8 of the third planet carrier PC3, the ninth operational element N9 of the third ring gear R3, and the tenth operational element N10 of the smaller diameter sun gear S4. The horizontal spacing between the three vertical lines depends on a sun gear/ring gear teeth ratio of the third planetary gear set PG3.

Forming such a shift diagram is obvious to a person of an ordinary skill in the art, and is not described in further detail.

<First Forward Speed>

As shown in FIG. 2, the first clutch C1 and the one-way clutch F or the first brake B1 operate at the first forward speed.

Regarding the first planetary gear set PG1, the third operational element N3 acts as a fixed element while the first operational element N1 receives the input speed from the input shaft IS. Therefore, the reduced speed is output from the first planetary gear set PG1 through the second operational element N2.

Regarding the second planetary gear set PG2, the fifth operational element N5 acts as a fixed element by the function of the one-way clutch F or the first brake B1 while the output speed of the second operational element N2 is inputted to the fourth operational element N4. Therefore, the second planetary gear set PG2 outputs a reversed speed through the sixth operational element N6.

Regarding the third planetary gear set PG3, the reversed speed of the sixth operational element N6 is inputted to the seventh operational element N7, and the output speed of the second operational element N2 is inputted to the tenth operational element N10 by the operation of the first clutch C1. Therefore, a first forward speed line SP1 is formed by the third planetary gear set PG3. Now, the final output speed of the gear train becomes a height D1 of the first forward speed line SP1 at the position of the ninth operational element N9, and thus the first forward speed is realized.

<Second Forward Speed>

At the second forward speed, the second brake B2 is controlled to operate from the state of the first forward speed.

In this case, the same as in the first forward speed, the first operational element N1 of the first planetary gear set PG1 receives the input speed from the input shaft IS, and the third operational element N3 acts as a fixed element. Therefore, the reduced speed is output from the first planetary gear set PG1 through the second operational element N2.

Regarding the second planetary gear set PG2, the output speed of the second operational element N2 is inputted to the fourth operational element N4, and the sixth operational element N6 acts as a fixed element by the operation of the second brake B2. Therefore, the second planetary gear set PG2 does not form any output speed since its output element becomes fixed by the operation of the second brake B2.

Then, regarding the third planetary gear set PG3, the seventh operational element N7 connected with the sixth operational element N6 acts as a fixed element by the operation of the second brake B2, and the output speed of the second operational element N2 is inputted to the tenth operational element N10 by the operation of the first clutch C1. Therefore, a second forward speed line SP2 is formed by the third planetary gear set PG3. Now, the final output speed of the gear train becomes a height D2 of the second forward speed line SP2 at the position of the ninth operational element N9, and thus the second forward speed is realized.

<Third Forward Speed>

At the third forward speed, the second brake B2 that operated at the second forward speed is released, and the fourth clutch C4 is controlled to operate.

In this case, the same as in the second forward speed, the first operational element N1 of the first planetary gear set PG1 receives the input speed from the input shaft IS, and the third operational element N3 acts as a fixed element. Therefore, the reduced speed is output from the first planetary gear set PG1 through the second operational element N2.

Regarding the second planetary gear set PG2, the fifth and sixth operational elements N5 and N6 become idle since none of the second clutch C2 and the first and second brakes B1 and B2 operate, although the second planetary gear set PG2 receives the reduced speed of the second operational element N2 through the fourth operational element N4. Therefore, in this case, the second planetary gear set PG2 does not contribute to the power transmission because it does not form an output speed.

Regarding the third planetary gear set PG3, the reduced speed of the second operational element N2 is inputted to the tenth operational element N10, while the third planetary gear set PG3 integrally rotates by the operation of the fourth clutch C4. In this case, the third planetary gear set PG3 outputs the same speed through the output path OP as inputted through the tenth operational element N10. Therefore, a third forward speed line SP3 is formed by the third planetary gear set PG3. Now, the final output speed of the gear train becomes a height D3 of the third forward speed line SP3 at the position of the ninth operational element N9, and thus the third forward speed is realized.

<Fourth Forward Speed>

At the fourth forward speed, the fourth clutch C4 that operated at the third forward speed is released, and the third clutch C3 is controlled to operate.

In this case, the same as in the third forward speed, the first operational element N1 of the first planetary gear set PG1 receives the input speed from the input shaft IS, and the third operational element N3 acts as a fixed element. Therefore, the reduced speed is output from the first planetary gear set PG1 through the second operational element N2.

Regarding the second planetary gear set PG2, the fifth and sixth operational elements N5 and N6 become idle since none of the second clutch C2 and the first and second brakes B1 and B2 operate, although the second planetary gear set PG2 receives the reduced speed of the second operational element N2 through the fourth operational element N4. Therefore, in this case, the second planetary gear set PG2 does not contribute to the power transmission because it does not form an output speed.

Regarding the third planetary gear set PG3, the reduced speed of the second operational element N2 is inputted to the tenth operational element N10 by the operation of the first clutch C1, and the engine speed is inputted to the eighth operational element N8 by the operation of the third clutch C3. Therefore, a fourth forward speed line SP4 is formed by the third planetary gear set PG3. Now, the final output speed of the gear train becomes a height D4 of the fourth forward speed line SP4 at the position of the ninth operational element N9, and thus the fourth forward speed is realized.

<Fifth Forward Speed>

At the fifth forward speed, the first clutch C1 that operated at the fourth forward speed is released, and the fourth clutch C4 is controlled to operate.

In this case, the same as in the fourth forward speed, the first operational element N1 of the first planetary gear set PG1 receives the input speed from the input shaft IS, and the third operational element N3 acts as a fixed element. Therefore, the reduced speed is output from the first planetary gear set PG1 through the second operational element N2.

Regarding the second planetary gear set PG2, the fifth and sixth operational elements N5 and N6 become idle since none of the second clutch C2 and the first and second brakes B1 and B2 operate, although the second planetary gear set PG2 receives the reduced speed of the second operational element N2 through the fourth operational element N4. Therefore, in this case, the second planetary gear set PG2 does not contribute to the power transmission because it does not form an output speed.

Regarding the third planetary gear set PG3, the engine speed of the input shaft IS is inputted to the eighth operational element N8 by the operation of the third clutch C3, while the third planetary gear set PG3 integrally rotates by the operation of the fourth clutch C4. In this case, the third planetary gear set PG3 outputs the same speed through the output path OP as the engine speed inputted through the eighth operational element N8. Therefore, a fifth forward speed line SP5 is formed by the third planetary gear set PG3. Now, the final output speed of the gear train becomes a height D5 of the fifth forward speed line SP5 at the position of the ninth operational element N9, and thus the fifth forward speed is realized.

<Sixth Forward Speed>

At the sixth forward speed, the fourth clutch C4 that operated at the fifth forward speed is released, and the second clutch C2 is controlled to operate.

Regarding the first planetary gear set PG1, the third operational element N3 acts as a fixed element while the first operational element N1 receives the input speed from the input shaft IS. Therefore, the reduced speed is output from the first planetary gear set PG1 through the second operational element N2.

Regarding the second planetary gear set PG2, the reduced speed of the second operational element N2 is inputted to the fourth operational element N4, and the second planetary gear set PG2 integrally rotates by the operation of the second clutch C2. In this case, the second planetary gear set PG2 directly outputs the reduced speed through the sixth operational element N6.

Regarding the third planetary gear set PG3, the output speed of the sixth operational element N6 is inputted to the seventh operational element N7, and the rotation speed of the input shaft IS is inputted to the eighth operational element N8 by the operation of the third clutch C3. Therefore, a sixth forward speed line SP6 is formed by the third planetary gear set PG3. Now, the final output speed of the gear train becomes a height D6 of the sixth forward speed line SP6 at the position of the ninth operational element N9, and thus the sixth forward speed is realized.

<Seventh Forward Speed>

At the seventh forward speed, the second clutch C2 that operated at the sixth forward speed is released, and the second brake B2 is controlled to operate.

Regarding the first planetary gear set PG1, the third operational element N3 acts as a fixed element while the first operational element N1 receives the input speed from the input shaft IS. Therefore, the reduced speed is output from the first planetary gear set PG1 through the second operational element N2.

Regarding the second planetary gear set PG2, the output speed of the second operational element N2 is inputted to the fourth operational element N4, and the sixth operational element N6 acts as a fixed element by the operation of the second brake B2. Therefore, the second planetary gear set PG2 does not form any output speed since its output element becomes fixed by the operation of the second brake B2.

Regarding the third planetary gear set PG3, the seventh operational element N7 directly connected to the sixth operational element N6 acts as a fixed element by the operation of the second brake B2, and the rotation speed of the input shaft IS is inputted to the eighth operational element N8 by the operation of the third clutch C3. Therefore, a seventh forward speed line SP7 is formed by the third planetary gear set PG3. Now, the final output speed of the gear train becomes a height D7 of the seventh forward speed line SP7 at the position of the ninth operational element N9, and thus the seventh forward speed is realized.

<Eighth Forward Speed>

At the eighth forward speed, the second brake B2 that operated at the seventh forward speed is released, and the first brake B1 is controlled to operate.

Regarding the first planetary gear set PG1, the third operational element N3 acts as a fixed element while the first operational element N1 receives the input speed from the input shaft IS. Therefore, the reduced speed is output from the first planetary gear set PG1 through the second operational element N2.

Regarding the second planetary gear set PG2, the output speed of the second operational element N2 is inputted to the fourth operational element N4, and the fifth operational element N5 acts as a fixed element by the operation of the first brake B1. Therefore, the second planetary gear set PG2 outputs a reversed speed through the sixth operational element N6.

Regarding the third planetary gear set PG3, the reversed speed of the sixth operational element N6 is inputted to the seventh operational element N7, and the rotation speed of the input shaft IS is inputted to the eighth operational element N8 by the operation of the third clutch C3. Therefore, an eighth forward speed line SP8 is formed by the third planetary gear set PG3. Now, the final output speed of the gear train becomes a height D8 of the eighth forward speed line SP8 at the position of the ninth operational element N9, and thus the eighth forward speed is realized.

<Reverse Speed>

At the reverse speed, the fourth clutch C4 and the first brake B1 are controlled to operate.

Regarding the first planetary gear set PG1, the third operational element N3 acts as a fixed element while the first operational element N1 receives the input speed from the input shaft IS. Therefore, the reduced speed is output from the first planetary gear set PG1 through the second operational element N2.

Regarding the second planetary gear set PG2, the output speed of the second operational element N2 is inputted to the fourth operational element N4, and the fifth operational element N5 acts as a fixed element by the operation of the first brake B1. Therefore, the second planetary gear set PG2 outputs a reversed speed through the sixth operational element N6.

Regarding the third planetary gear set PG3, the reversed speed of the sixth operational element N6 is inputted to the seventh operational element N7, and the third planetary gear set PG 3 integrally rotates by the operation of the fourth clutch C4. In this case, the third planetary gear set PG3 outputs the same reversed speed through the output path OP as inputted through the seventh operational element N7. Therefore, a reverse speed line RS is formed by the third planetary gear set PG3. Now, the final output speed of the gear train becomes a height SR of the reverse speed line RS at the position of the ninth operational element N9, and thus the reverse speed is realized.

Figure 4:
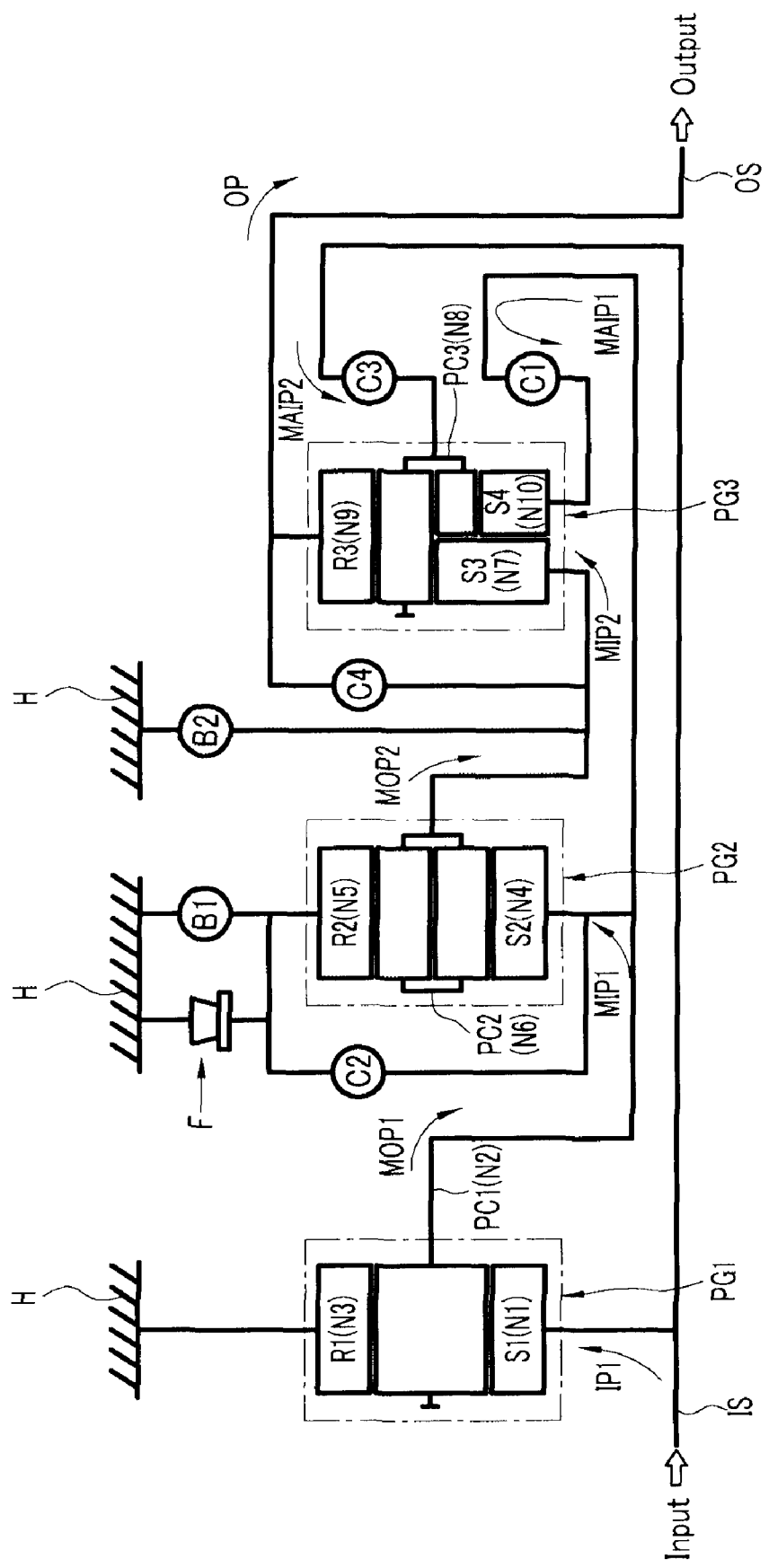
FIG. 4 is a schematic diagram of a gear train of an automatic transmission according to a second exemplary embodiment of the present invention.
Figure 5:
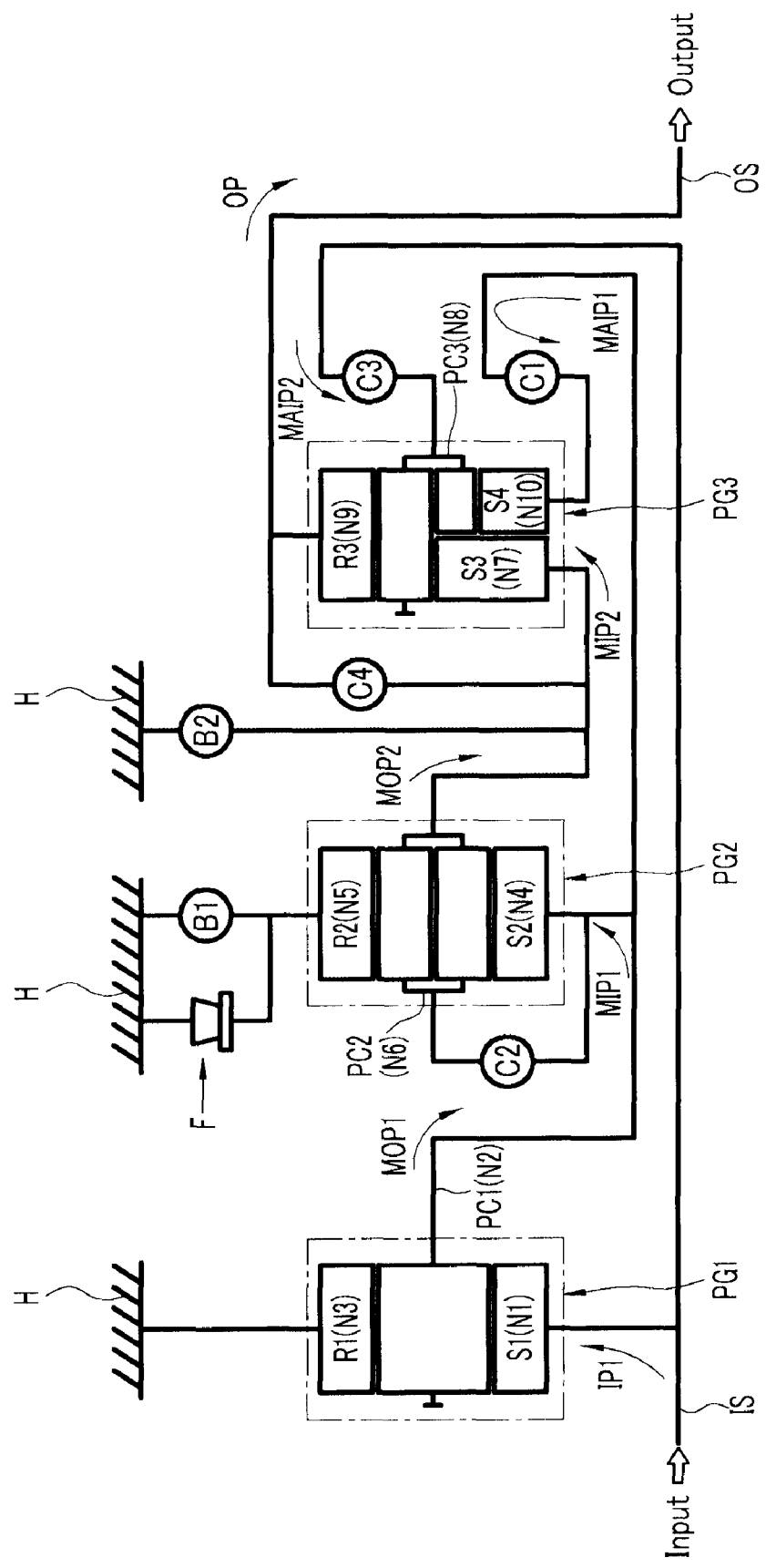
FIG. 5 is a schematic diagram of a gear train of an automatic transmission according to a third exemplary embodiment of the present invention.

FIG. 4 and FIG. 5 are schematic diagrams of a gear train of an automatic transmission according to second and third exemplary embodiment of the present invention. The gear trains shown in FIG. 4 and FIG. 5 are almost the same as the gear train according to the first exemplary embodiment of the present invention, but they differ therefrom, in the arrangement of the second clutch C2 that enable the second planetary gear set PG2 to integrally rotate.

In more detail, according to the second exemplary embodiment as shown in FIG. 4, the second clutch C2 is arranged to variably interconnect the second sun gear S2 and the second ring gear R2. According to the third exemplary embodiment as shown in FIG. 5, the second clutch C2 is arranged to variably interconnect the second sun gear S2 and the second planet carrier PC2.

Regarding the location of the second clutch C2, the second clutch C2 of the first exemplary embodiment is arranged between the first brake B1 and the second brake B2, i.e., rearward of the second planetary gear set PG2. However, according to the second and third exemplary embodiment, the second clutch C2 is arranged between the first and second planetary gear sets PG1 and PG2, i.e., forward to the second planetary gear set PG2.

The second clutch C2 of the second and third exemplary embodiments also performs exactly the same function of enabling the second planetary gear set PG2 to integrally rotate. Therefore, the shifting operations of the second and third exemplary embodiments are the same as in the first exemplary embodiment, and are not described in further detail.

The forgoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiment were chosen and described in order to explain certain principles of the invention and their practical application, to thereby enable others skilled in the art to make and utilize various exemplary embodiments of the present invention, as well as various alternatives and modifications thereof. It is intended that technical spirit and scope of the present invention be defined by the Claims appended hereto and their equivalents.

What is claimed is:

1. A gear train of an automatic transmission for a vehicle, comprising:
    a first planetary gear set of a simple planetary gear set that receives an input speed from an input shaft through a first input path and outputs a reduced speed through a first intermediate output path;
    a second planetary gear set of a simple planetary gear set that receives the reduced speed of the first intermediate output path of the first planetary gear set through a first intermediate input path and selectively outputs through a second intermediate output path a same speed as or a reversed speed of the reduced speed received through a first intermediate output path; and
    a third planetary gear set of a compound planetary gear set that receives the reduced speed of the first planetary gear set through a first intermediate variable input path, the input speed from the input shaft through a second intermediate variable input path, and/or the output speed of the second planetary gear set through a second intermediate input path, and then outputs a shifted output speed through a main output path,
    wherein the second intermediate output path is always connected with the second intermediate input path.

2. The gear train of claim 1, wherein:
    the first planetary gear set is a single pinion planetary gear set;
    the second planetary gear set is a double pinion planetary gear set; and
    the third planetary gear set is a compound planetary gear set that is formed as a combination of single and double pinion planetary gear sets having a common ring gear and a common planet carrier.

3. The gear train of claim 1, wherein the first planetary gear set comprises a first sun gear, a first planet carrier, and a first ring gear, wherein:
    the first sun gear acts as an input element and forms the first input path;
    the first planet carrier acts as an output element and forms the first intermediate output path; and
    the first ring gear is directly connected with a transmission housing and acts as a fixed element.

4. The gear train of claim 1, wherein the second planetary gear set comprises a second sun gear, a second planet carrier, and a second ring gear, wherein:
    the second sun gear is directly connected with the first intermediate output path of the first planetary gear set and forms the first intermediate input path;
    the second planet carrier acts as an output element and forms the second intermediate output path;
    the second ring gear is variably connected with a transmission housing and selectively acts as a fixed element; and
    a clutch is arranged to variably interconnect two elements among the second sun gear, the second planet carrier, and the second ring gear such that the second planetary gear may integrally rotate under an operation of the clutch.

5. The gear train of claim 4, wherein the clutch is arranged to variably interconnect the second planet carrier and the second ring gear.

6. The gear train of claim 5, wherein the clutch is arranged rearward of the second planetary gear set.

7. The gear train of claim 4, wherein the clutch is arranged to variably interconnect the second sun gear and the second ring gear.

8. The gear train of claim 7, wherein the clutch is arranged forward to the second planetary gear set.

9. The gear train of claim 4, wherein the clutch is arranged to variably interconnect the second sun gear and the second planet carrier.

10. The gear train of claim 9, wherein the clutch is arranged forward to the second planetary gear set.

11. The gear train of claim 1, wherein the third planetary gear set comprises a smaller diameter sun gear, a larger diameter sun gear, a third planet carrier, and a third ring gear, wherein:
    the smaller diameter sun gear is variably connected with the first intermediate output path of the first planetary gear set and forms the first intermediate variable input path;
    the larger diameter sun gear is directly connected with the second intermediate output path of the second planetary gear set so as to form the second intermediate input path and is variably connected with a transmission housing so as to selectively act as a fixed element;

the third planet carrier is variably connected with the input shaft so as to form the second intermediate variable input path; and the third ring gear is variably connected with the larger diameter sun gear and acts as an output element so as to form the main output path.

12. A gear train of an automatic transmission for a vehicle, comprising first, second, and third planetary gear sets, wherein:

the first planetary gear set is a single pinion planetary gear set and comprises a first sun gear directly connected with an input shaft so as to act as an input element, a first planet carrier acting as an output element so as to form a first intermediate output path, and a first ring gear directly connected with a transmission housing so as to act as a fixed element;

the second planetary gear set is a double pinion planetary gear set and comprises a second sun gear directly connected with the first intermediate output path of the first planetary gear set so as to form a first intermediate input path, a second planet carrier acting as an output element so as to form a second intermediate output path, and a second ring gear variably connected with a transmission housing through a one-way clutch or a first brake so as to selectively act as a fixed element, where a second clutch is arranged between two operational elements selected from the second sun gear, the second planet carrier, and the second ring gear; and the third planetary gear set is a compound planetary gear set and comprises a smaller diameter sun gear forming a first intermediate variable input path by being variably connected with the first intermediate output path of the first planetary gear set through a first clutch, a larger diameter sun gear forming a second intermediate input path by being directly connected with the second intermediate output path of the second planetary gear set, a common planet carrier forming a second intermediate variable input by being variably connected with the input shaft through a third clutch, and a common ring gear variably connected with the larger diameter sun gear through a fourth clutch and forming a main output path.

13. The gear train of claim 12, wherein the second clutch is arranged to variably interconnect the second planet carrier and the second ring gear.

14. The gear train of claim 13, wherein the second clutch is arranged rearward of the second planetary gear set.

15. The gear train of claim 12, wherein the second clutch is arranged to variably interconnect the second sun gear and the second ring gear.

16. The gear train of claim 15, wherein the second clutch is arranged forward to the second planetary gear set.

17. The gear train of claim 12, wherein the second clutch is arranged to variably interconnect the second sun gear and the second planet carrier.

18. The gear train of claim 17, wherein the second clutch is arranged forward to the second planetary gear set.

* * * * *